(12) United States Patent
Roebuck

(10) Patent No.: US 11,087,280 B2
(45) Date of Patent: Aug. 10, 2021

(54) USER ANALYTICS FOR INTERVIEW AUTOMATION

(71) Applicant: HRB Innovations, Inc., Las Vegas, NV (US)

(72) Inventor: Eric R. Roebuck, Shawnee, KS (US)

(73) Assignee: HRB Innovations, Inc., Las Vegas, NV (US)

( * ) Notice: Subject to any disclaimer, the term of this patent is extended or adjusted under 35 U.S.C. 154(b) by 1168 days.

(21) Appl. No.: 15/475,445

(22) Filed: Mar. 31, 2017

(65) Prior Publication Data

US 2018/0285757 A1 Oct. 4, 2018

(51) Int. Cl.
| | | |
|---|---|---|
| *G06Q 10/10* | (2012.01) | |
| *G06N 5/04* | (2006.01) | |
| *G06N 5/02* | (2006.01) | |
| *G06Q 20/20* | (2012.01) | |
| *G06Q 40/00* | (2012.01) | |
| *G06N 3/00* | (2006.01) | |

(52) U.S. Cl.
CPC .......... *G06Q 10/10* (2013.01); *G06N 5/022* (2013.01); *G06N 5/041* (2013.01); *G06Q 20/207* (2013.01); *G06Q 40/00* (2013.01); *G06N 3/006* (2013.01); *G06Q 40/123* (2013.12)

(58) Field of Classification Search
CPC ...... G06Q 10/10; G06Q 20/207; G06Q 40/00; G06Q 40/123; G06N 5/022; G06N 5/041; G06N 3/006
USPC ........................................ 705/3–44
See application file for complete search history.

(56) References Cited

U.S. PATENT DOCUMENTS

| | | | | |
|---|---|---|---|---|
| 7,522,060 | B1* | 4/2009 | Tumperi | G06Q 50/26 340/573.4 |
| 8,407,113 | B1* | 3/2013 | Eftekhari | G06Q 40/123 705/31 |
| 8,651,871 | B2* | 2/2014 | Morais | G09B 7/02 434/219 |
| 9,153,142 | B2* | 10/2015 | Bagchi | G06N 5/02 |
| 9,607,620 | B2* | 3/2017 | Jones | H04M 3/42221 |
| 10,169,828 | B1* | 1/2019 | Morin | G06Q 40/123 |

(Continued)

OTHER PUBLICATIONS

"Preparing a Tax Return using OpenRules Dialolg" Dialog 1040EZ Tutorial, OpenRules, Open Source Business Decision Management System Release 6.1, www.openrules.com, August. (Year: 2011).*

(Continued)

*Primary Examiner* — Frantzy Poinvil
(74) *Attorney, Agent, or Firm* — Erise IP, P.A.

(57) ABSTRACT

Methods and media for predicting responses to discovery questions while interviewing a user. Embodiments of the invention begin by collecting information about the user from various sources. Factors affecting likely responses to discovery questions are identified and a score for each discovery question is determined. These scores may be adjusted as additional information is gathered and as the user answers other interview questions. Then, for each discovery question, the score is compared to a first threshold. If the score is above that first threshold, then the discovery question can be skipped. Otherwise the score is compared to a second, lower threshold. If the score is above that threshold, the likely answer to the discovery question can be presented to the user to confirm. Otherwise, the discovery question is presented to the user to answer.

20 Claims, 3 Drawing Sheets

(56) References Cited

U.S. PATENT DOCUMENTS

| | | | | |
|---|---|---|---|---|
| 10,475,133 B1* | 11/2019 | Cabrera | ............ | G06Q 50/26 |
| 10,546,229 B2* | 1/2020 | Manico | ............ | G06Q 10/1093 |
| 10,621,880 B2* | 4/2020 | Boguraev | ............ | G09B 7/00 |
| 2012/0109792 A1* | 5/2012 | Eftekhari | ............ | G06Q 40/02 |
| | | | | 705/31 |
| 2016/0078567 A1* | 3/2016 | Goldman | ............ | G06Q 40/123 |
| | | | | 705/31 |
| 2016/0148321 A1* | 5/2016 | Ciaramitaro | ............ | G06Q 40/123 |
| | | | | 705/31 |
| 2017/0004584 A1* | 1/2017 | Wang | ............ | G06Q 40/123 |

OTHER PUBLICATIONS

"Ways to Increase Your Tax Refund you Never Thought About-Turbo Tax Tips . . . ", Year (Year: 2017).*

* cited by examiner

USER ANALYTICS FOR INTERVIEW AUTOMATION

BACKGROUND

1. Field

Embodiments of the invention generally relate to effectively interviewing a user to determine information to complete a form and, more particularly, to automatically inferring likely answers to discovery questions allowing entire sections of the interview to be skipped.

2. Related Art

Traditionally, when conducting interviews in order to gather the information needed to complete complex forms, "discovery questions" are used. These questions are not themselves used in completing the complex form, but rather are used to determine which other questions need be asked of the user. For example, when completing a tax return, questions relating to childcare expenses can be skipped if a discovery question determines that the user does not have any children.

However, discovery questions themselves can add to the total number of questions a user must answer. In the example above, a user who does have children will have to answer the discovery question in addition to the original questions relating to childcare. As such, the interface for conducting the tax interview can be improved if discovery question can be automatically answered or (where it is not possible to automatically answer them) presented in such a way that the use can confirm that the most likely response is the correct one.

SUMMARY

Embodiments of the invention address the above-described need by providing for a system that can automatically determine the most likely answers to interview questions. In particular, in a first embodiment, the invention includes a method for predicting a user's responses to an interview question, comprising the steps of collecting information about the user, determining a discovery question to be answered by the user, wherein the discovery question determines whether one or more associated questions will be presented to the user, determining a confidence score for the discovery question and a likely response to the discovery question, if the confidence score for the discovery question is above a first threshold, determining whether to present the one or more associated questions based on the likely response to the discovery question, if the confidence score for the discovery question is below the first threshold and above a second threshold, presenting the likely response to the user with a prompt for confirmation; and determining whether to present the one or more associated questions based on the user's response to the prompt for confirmation, if the confidence for the discovery question is below the second threshold presenting the discovery question to the user; and determining whether to present the one or more associated questions based on the user's response to the discovery question, and if it was determined to present the one or more associated questions to the user, presenting the one or more associated questions to the user; and if was determined not to present the one or more associated questions to the user, skipping the one or more associated questions.

In a second embodiment, the invention includes one or more non-transitory computer storage media storing computer-executable instructions that, when executed by a processor, perform a method of predicting a user's response to an interview question comprising the steps of determining information about the user based at least in part on the user's responses to interview questions included in a prior interview, determining a plurality of discovery question to be answered by the user, wherein each discovery question of the plurality of discovery questions determines whether one or more associated questions will be presented to the user; and for each discovery question of the plurality of discovery questions, determining a confidence score for the discovery question and a likely response to the discovery question, if the confidence score for the discovery question is above a first threshold, determining whether to present the one or more associated questions based on the likely response to the discovery question, if the confidence score for the discovery question is below the first threshold and above a second threshold presenting the likely response to the user with a prompt for confirmation; and determining whether to present the one or more associated questions based on the user's response to the prompt for confirmation, if the confidence for the discovery question is below the second threshold, presenting the discovery question to the user; and determining whether to present the one or more associated questions based on the user's response to the discovery question, and if it was determined to present the one or more associated questions to the user, presenting the one or more associated questions to the user, and if was determined not to present the one or more associated questions to the user, skipping the one or more associated questions.

In a third embodiment, the invention includes one or more non-transitory computer storage media storing computer-executable instructions that, when executed by a processor, present a user interface configured to conduct an interview with a user, wherein the user interface is configured to determine a confidence score for a discovery question and a likely response to the discovery question, wherein the discovery question determines whether one or more associated questions will be presented to the user, if the confidence score for the discovery question is above a first threshold, determine whether to present the one or more associated questions based on the likely response to the discovery question, if the confidence score for the discovery question is below the first threshold and above a second threshold present the likely response to the user with a prompt for confirmation, and determine whether to present the one or more associated questions based on the user's response to the prompt for confirmation, if the confidence for the discovery question is below the second threshold present the discovery question to the user, and determine whether to present the one or more associated questions based on the user's response to the discovery question, and if it was determined to present the one or more associated questions to the user, present the one or more associated questions to the user, and if was determined not to present the one or more associated questions to the user, skip the one or more associated questions.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
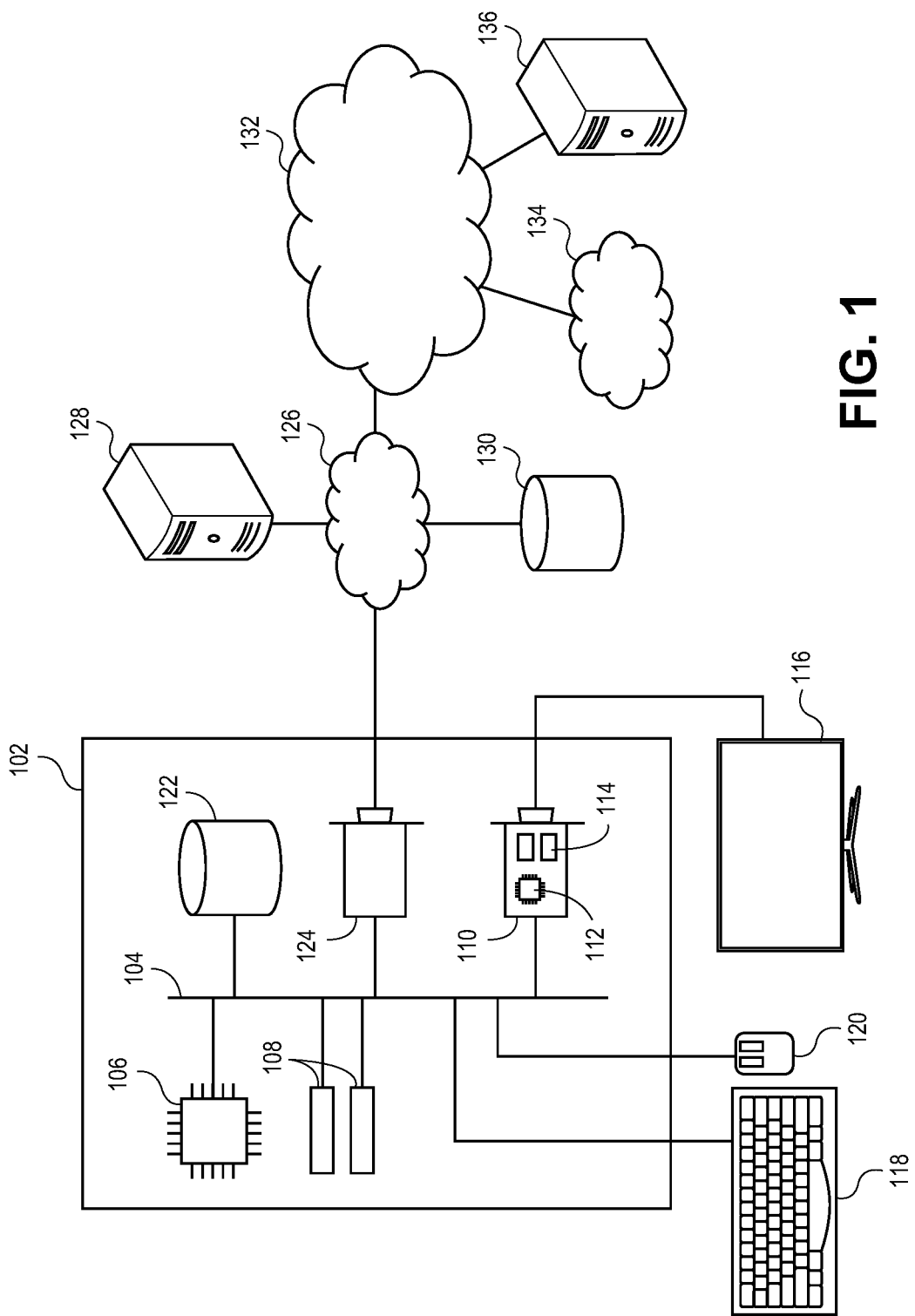
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention begin by collecting information from various sources. Factors affecting discovery questions are identified based on predetermined rules and a score for each discovery question is determined. These scores may be adjusted as additional information is gathered and as the user answers other interview questions. Then, for each discovery question, the score is compared to a first threshold. If the score is above that first threshold, then the discovery question can be skipped. Otherwise the score is compared to a second, lower threshold. If the score is above that threshold, the likely answer to the discovery question can be presented to the user to confirm. Otherwise, the discovery question is presented to the user to answer.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

I. Operational Environment for Embodiments of the Invention

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

II. Operation of Embodiments of the Invention

Figure 2:
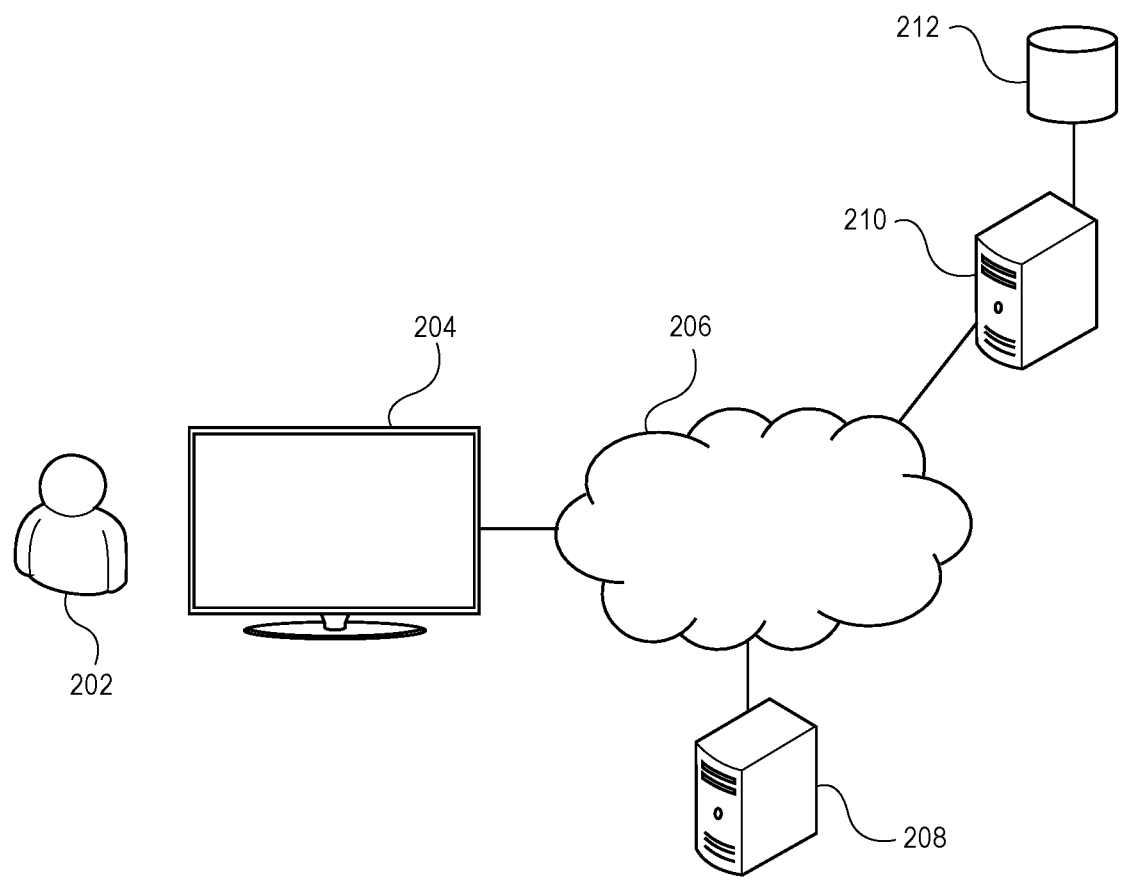
FIG. 2 depicts a block diagram illustrating certain components useable with embodiments of the invention.

Turning now to FIG. 2, a block diagram illustrating certain components useable with embodiments of the invention is depicted and referred to generally by reference numeral 200. Broadly, system 200 allows user 202 to more efficiently and accurately provide standardized information for subsequent processing. For example, in the context of tax preparation, system 200 might conduct a tax interview of a taxpayer to collect the necessary information to prepare their taxes. Alternatively, system 200 could collect information on a job seeker's qualification, experience, and credentials in order to prepare a resume and complete a variety of different job applications. As yet another alternative, system 200 could collect a student's grades, interests, and extracurricular activities to complete one or more college applications. Broadly, system 200 is applicable in any application where unstructured information must be gathered from user 202 for use in automated or standardized processing.

Furthermore, it should be appreciated that the tax situation and tax data items used as a running example herein relate to a particular taxpayer, although a user of the invention may be the taxpayer or a third party operating on behalf of the taxpayer, such as a professional tax preparer ("tax professional") or an authorized agent of the taxpayer. Therefore, use of the term "taxpayer" herein is intended to encompass either or both of the taxpayer and any third party operating on behalf of the taxpayer. Additionally, a taxpayer may comprise an individual filing singly, a couple filing jointly, a business, or a self-employed filer.

Computer 204 presents a user interface for the tax interview to the user 202. This interface broadly functions to present questions to the user and receive information (such as items of tax data) from the user. It is an object of the invention to reduce the number of questions that the user must answer. This can be accomplished by automatically answering discovery question (when confidence in the answer is high) and presenting presumed answers which the user need merely confirm to be correct (which confidence is moderate). In order to determine answers to these questions, computer 204 communicates via network 206 with server 208.

In some embodiments server 208 is a central server (such as, for example a web server) that provides the interface to may computers like computer 204. In other embodiments, the functionality provided by server 208 can be integrated into computer 204. Broadly speaking, it is the function of server 208 to prepare the complex form based on user 202's responses to the interview and imported data (e.g., wage statements such as W-2s, supplementary income statements such as 1099s, and deduction statements such as 1098s). In traditional systems, the element corresponding to server 208 takes input directly from the user to complete the form or determine information to import from another information providers. In some such systems, basic demographic information (e.g., a taxpayer's name, social security number, and address) is saved from year to year. This information can then be presented to the user to confirm rather than requiring that the re-enter it with the attendant chance for error.

It is frequently the case that entire categories of questions are inapplicable to a particular user. For example, a taxpayer may not have any dependents and questions relating to child support, child care expenses, dependent deductions and the like are inapplicable. Similarly, questions relating to previous professional experience may be inapplicable to a job seeker applying for their first job out of college. In order to determine which interview sections can be skipped for a particular user, discovery questions are used. As used herein, the term "discovery question" means a question that is not used directly in completing a form, but which instead determines whether other questions are presented to the user.

As described above, the user experience can be improved if unnecessary discovery questions are not presented to the user. For example, if confidence is high that a discovery question would indicate that a set of interview questions will need to be presented to the user, then the discovery question can be omitted and the set of questions simply presented. Alternatively, if confidence is high that the set of questions can be skipped, then the discovery question as well as the set of associated questions can be skipped. Information usable to determine the most likely answer to a discovery question (and the confidence in that answer) can be determined form a variety of sources. In some embodiments, answers to discovery questions can lead to not having to ask further discovery questions. For example, if the system has a high degree of confidence that the user does not have children, the system could skip further follow-up questions about dependents.

Third-party data server 210, with attached third-party data store 212, stores and makes available a variety of data about the user that can be used to automatically determine answers to discovery questions. In some embodiments of the invention, a plurality of third-party data servers can be used to collect different information about the user, or to provide higher confidence in the information collected from a single third-party data server. For example, a credit report for a user could include more two addresses (one for a home with a mortgage and one for a rented apartment), and the current address could be determined by cross-referencing the credit report with demographic information from social media and property ownership records from a county registrar of deeds.

One of skill in the art will appreciate that any source of data about the user could include information usable to complete forms. For clarity, however, the term "third-party data source," as used herein, refers to a source of data other than the user that provides information that affects the determination of a most likely answer to a discovery question, as contrasted to responses provided directly by the user. Numerous examples are given below of third-party data sources, but such examples are intended to be illustrative rather than exhaustive. As described in greater detail below, non-third-party data sources can also be used. For example, responses to interview questions by the user (or by similar users) can also lead to increases or decreases in the confidence scores to other discovery questions. For example, if a user indicates that they own their home, the confidence score of the discovery question "Do you have a mortgage?" could increase based on the user's income level and age and the income levels and ages of other, similar users. This could increase the level of confidence to 100% confidence or to a level less than 100%.

As described above, a user's social media profiles can be used to obtain information usable to determine answers to discovery questions. This information can be either directly imported from user metadata fields in the social media profile (e.g., marital status, state of residence, employer, or college attended), inferred from changes in the social media profile, or inferred from other content on the social media profile. These latter two cases warrant further discussion below.

In certain cases, a relevant life event for the purposes of the interview stems from a change in the user's circumstances. For example, a taxpayer changing jobs over the course of the tax year may indicate that they should be prompted for expenses related to job searching, for unemployment income, and to import income statements from the new employer as well as the old employer. Looking solely at social media profile only once, at the time the tax return is being prepared, will miss these details. Similarly, a changed address may indicate that the user should be prompted for moving expenses, and a change in marital status may indicate that the user should be prompted for alimony expenses or income. As such, certain embodiments of the invention will monitor the user's social media profile over the course of the year (or review the social media activity for the year at the end of the year) so as to collect historical information as well as changes in the information that indicate relevant life events.

Relevant life events may also be inferred from the user's social media profiles even where they are not explicitly tagged as such. For example, if a taxpayer posts a picture of a graduation, this image may be recognized and the taxpayer prompted for education expenses and tax credits, student loan interest deductions and other tax interview portions related to graduation and job searching. In some embodiments, explicit information may be combined with implicit information to determine the most likely answers to discovery questions. For example, if the graduation picture above is recognized, but the user's employment status remained unchanged, it may be the case that the taxpayer's child has graduated. This will cause a different set of interview portions to be presented to a user. Similarly, a photo of a newborn may cause the user to be presented with additional questions about dependents and health-care expenses.

Other forms of unstructured information may also be analyzed to infer relevant information. For example, a user's resume, obtained from a professional networking site, can provide employment information usable to determine likely answers to discovery questions. Similarly, event invitations, such as an accepted invitation to attend a job fair may indicate that the user should be prompted with interview questions about job-hunting expenses.

The use of a variety of third-party data sources such as data source 210 is contemplated. Some third-party data sources may provide a wide variety of information on the taxpayer, while others may only provide a single data item. As described above, social media websites (such as, for example, Facebook™ or LinkedIn™) can serve as a source of information about the taxpayer. In some embodiments, social media aggregators such as Spokeo can be used in addition or instead. Similarly, other data aggregators such as credit bureaus (e.g., Experian, Equifax, or TransUnion) and public records sites (e.g., Lexis PeopleWise or Westlaw PeopleMap) similarly provide a broad range of information about the taxpayer.

Other data sources may provide more limited or specialized information about the taxpayer. Healthcare coverage aggregators can be used to determine whether the taxpayer has required health insurance coverage. Similarly, the Social Security Death Master File can indicate that the taxpayer is deceased and provide an appropriate interview. As discussed above, property tax records can be used to determine home ownership for the purposes of prompting the taxpayer about rental income or mortgage interest deduction. The Department of Defense makes available tools to determine military service within the past tax year, and the Customs and Immigration Service can provide citizenship information for the taxpayer. Financial services aggregators can be used to determine a taxpayer's wealth profile, which can in turn be used to tailor investment-related portions of the tax interview or prompt the user with sources for tax documents.

Figure 3:
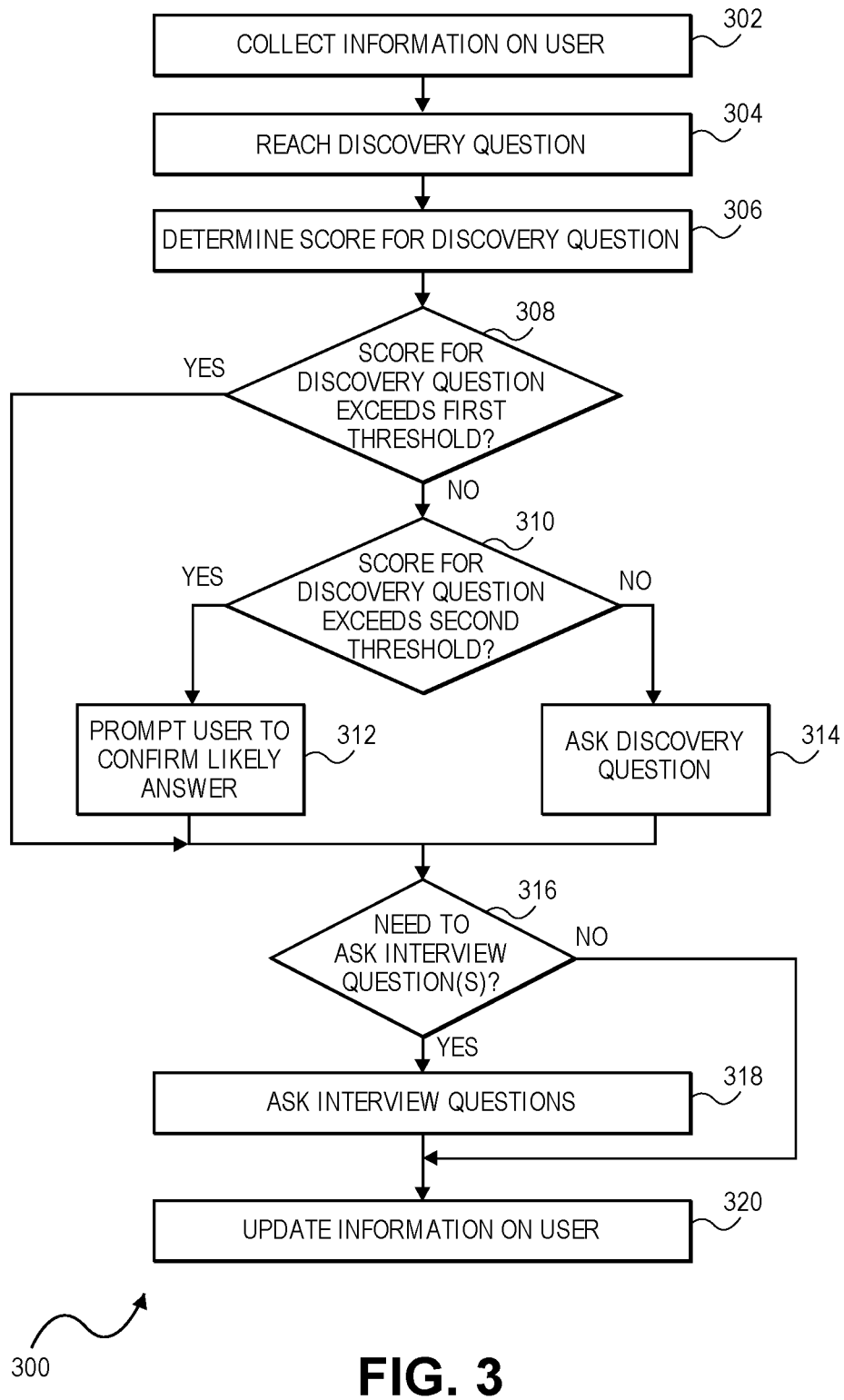
FIG. 3 depicts a flowchart illustrating the operation of a method in accordance with an embodiment of the invention.

Turning now to FIG. 3, a flowchart illustrating the operation of a method in accordance with an embodiment of the invention is depicted and generally referred to by reference numeral 300. The method begins at a step 302, where information about the user is collected. Information may be collected from a variety of sources. As described above, social media feeds for the user may be one source of information that can be used to infer likely answers to discovery questions. Similarly, publicly accessible governmental and privately operated records sites can be a source of information about the user. In some embodiments, search engines may be queried about the user in order to determine relevant information without the need to request it form the user.

In some embodiments, information or access provided by the user for another purpose can be opportunistically used to infer likely answers to discovery questions as well. For example, if a taxpayer imports a W-2 in order to provide wage information, the field indicating whether the employer provides health insurance can be used to infer the likely answer to whether the taxpayer had health insurance. Similarly, if a student applying to college provides access to their transcripts for the purposes of reporting their GPA, then the transcripts can also be user to infer information about their extracurricular activities. Information provided directly by the user during the current interview, during a previous interview, or while using another product can likewise be used. In some embodiments, discrepancies in information provided or supplied by the user can be another source of data usable to infer likely answers to discovery questions. For example, if the use provides two wage statements with different addresses for the same taxpayer, this may serve as an indicator that the taxpayer has moved over the course of a tax year and the discovery question "Did you move this year?" can be skipped.

In some embodiments, information can be inferred from other, similar users' responses. For example, it may be the case that, for couples filing jointly, 80% of couples where both spouses report wage income also report child care expenses as compared to only 10% of couples where only one spouse reports wage income. In such a case, a couple reporting wages for both spouses could skip the discovery question as to whether they had child care expenses in favor of presenting the associated set of questions unconditionally. As discussed in additional detail below, this could also cause the system to prompt the user to confirm the likely answer to the discovery question instead of skipping it entirely.

Processing can then proceed to a step 304, where the interview reaches a discovery question. In some embodiments, all discovery questions are presented at the beginning of the interview. In other embodiments, discover questions immediately precede the set of associated questions. In the latter case, more information may be available to determine the likely answer to the discovery question based on user responses to prior questions.

Processing continues at a step 306, where the score for the discovery question is determined. In some embodiments, the score for the discovery question is a probability that the associated set of questions will need to be asked. In other embodiments, the score for the discovery question is a most likely answer for the discovery question and a confidence in that answer. One of skill in the art will appreciate that these forms are essentially interchangeable. For example, if the confidence that the questions will need to be asked is 80%, it could be converted into a most likely score (yes, since it is greater than 50%) and a confidence (60%, since it is 60% of the way from the midpoint to the extreme). The reverse conversion is also possible.

In order to calculate the score for a discovery question, one or more factors may be taken into account. As used herein, the term "factor" means a rule for adjusting the score for a discovery question based on one or more data points gathered in step 302 or during the interview. In some embodiments, discovery questions start with a predetermined likelihood of being asked. For example, all questions may initially be asked with 100% probability, which is then adjusted based on any factors associated with that question. For example, one factor for the discovery question "Are you or your spouse currently serving on active duty in the U.S. military?" might be "IF no W-2 includes an Employer Identification Number associated with a military branch, THEN decrease probability by 50%." Based on that factor, the score for the associated discovery question might be reduced from 100% to 50%. In some embodiments, or for some interviews, multiple factors might depend on a single data point. When that data point is unknown, the confidence may be lower for factors that depend on it. In such cases, a new discovery question may be created and presented to the user first to determine that single data point, thereby enabling multiple other discovery questions to be skipped or otherwise abbreviated, as discussed below.

Multiple factors can be associated with each discovery question. For example, another factor for the same question might be "If age is above 68, reduce score by 100%." In some embodiments, discovery question scores are bounded between 0% and 100%. In other embodiments, other bounds are used instead. In still other embodiments, scores can be arbitrarily high and/or arbitrarily low. Broadly speaking, factors can affect scores in arbitrary ways. For example, scores can be set to the maximum or minimum values instead of being increased or decreased by a set amount. Factors can be based on any number of data points. For example, one factor for the discovery question "Do you have a new baby in the past year?" might be "IF Social media feed includes more than 5 uses of the word 'baby' AND Credit card shows more than one charge at Babies'R'Us, THEN increase score by 40%." Some factors may provide a definitive answer to the associated discovery questions. For example, the if a taxpayer provides a 1098 statement of mortgage interest, then they definitely owned a house during the relevant period, and there is no need to ask the associated discovery question. Similarly, if one or more banks accounts for the user shows day care payments, then there is no need to ask whether they have incurred child care expenses.

In some embodiments, factors affecting discovery questions are specified by subject-matter experts. For example, a financial advisor would know that a person over the age of 59 should be prompted about income from IRA withdrawals, but an 18-year-old probably should not be. In other embodiments, machine learning techniques can be used to automatically determine new factors based on previously conducted interviews, as discussed in greater detail below. In still other embodiments, both automatically determined and manually created factors are used to adjust the score for discovery questions. In some such embodiments, automatically created factors are initially used to adjust the question score, and manually created factors then take priority.

As mentioned above, machine learning and other statistical tools can be used to predict the answers to discovery questions based on similar patterns in previously conducted interviews. A person of skill in the art will appreciate that such a calculation, particularly on a large data set, is only possible with the aid of computer-assisted statistical techniques such as multivariate analysis and/or cluster analysis. Each discovery question represents one or more characteristics associated with the interview that informs the relevant portions of the tax interview. As such, some factors, and the associated data points and portions of the tax interview, may be intuitive. For example, the data point of "has a rural zip code" may be associated with a factor that increases the score for discovery questions determining whether questions about farm income should be included in the interview. Other factors determined by statistical analysis may not have such a semantic connection between the indicator variable and the relevant portions of the interview. For example, a particular income level in combination with a lack of dependents may indicate that questions about self-employment are less likely to be needed in a particular tax interview.

In one embodiment, a cluster analysis technique such as density-based clustering can be employed. In general, cluster analysis is the study of how to group a set of objects in such a way that similar objects are placed in the same group. These categories need not be known a priori, or even have any semantic meaning associated with them. Here, the objects are the interviews being conducted and the corresponding forms being completed. Density-based clustering defines clusters to be areas of higher density in a higher-dimension space representing the various features of the objects. Thus, clusters in this application will contain interviews (and corresponding forms) that share many features. As such, the portions of the interview that are relevant will have similarities among the interviews in a cluster.

In another embodiment, a different technique such as biclustering is used. Biclustering allows the simultaneous clustering of the dependent and independent variables of a data set. In this way, a set of dependent variables (here, data items about the user) that exhibit similar behaviors across a set of independent variables (here, for example, stored responses to interview questions) can be identified, and vice versa. These biclusters can then be used to predict the interview questions that will be relevant for a given interview.

Other statistical or non-statistical techniques can also be used to predict the factors that can affect a given discovery question. For example, the presence of a given tax form may be determined to reliably correlate to the filing of a particular schedule that requires asking some interview question(s). Additionally, it will be appreciated that, as additional interviews are completed and analyzed, the set of factors affecting each discovery question can be refined by re-analyzing the augmented data set to improve accuracy. Accordingly, the system may regularly re-calculate the factors based on the most current data.

Once the score for the discovery question has been calculated at step 306, processing can proceed to decision 308, where the score for the question is compared to a first threshold. The first threshold (and the second threshold, discussed below) can be selected so as to trade off interview efficiency (i.e., avoiding asking unnecessary questions) against interview accuracy (avoiding skipping questions that need to be asked). The threshold can differ from question to question. For example, a discovery question that would lead to a long series of questions resulting in a small tax deduction might have a lower threshold than a discovery question which could result in an audited return if the questions were mistakenly not asked. For example, one question might have a first threshold of 75%, another might have a confidence score threshold of 90%, and a third might have a confidence score threshold of 100% (i.e., requiring absolute certainty). If the confidence score exceeds the first threshold, processing skips to decision 316; otherwise, processing proceeds to decision 310. In some embodiments, instead of a question being skipped completely, it is asked in leading form so as to maintain user engagement.

At decision 310, the confidence score is compared to a second threshold. Generally this second threshold will be lower than the first threshold. In some cases, however, it may be equal to the first threshold. For example, where absolute certainty is required, both the first and second thresholds may be 100% to ensure that the discovery question is always asked unless the answer is known with complete certainty in advance. If the score exceeds the second threshold, processing proceeds to a step 312; otherwise processing proceeds instead to a step 314.

When processing reaches step 312, the most likely answer to the discovery question is known. At step 312, the user is prompted to confirm that the answer is correct (instead of supplying the answer from scratch as would otherwise be required). If the answer is not correct, the user can provide the correct one. In some embodiments, all of these prompts are provided at the same time so as to minimize the time required for the user to review and confirms that the inferred answered are correct. In this fashion, user effort is saved and user engagement is maintained. If the score was below the second threshold at decision 310, processing moves to step 314 instead, where the discovery question is asked in conventional form.

After step 308, 312, or 314, the answer to the discovery question is known with certainty, and decision 316 uses that answer to determine whether to ask the associated set of interview questions. If the questions need to be asked, processing proceeds to step 318 where the interview question or questions associated with the discovery question are asked. Otherwise processing skips to step 320. At step 320, any additional information gained over the course of method 300 is used to update the factors affecting subsequent discovery questions. For example, the initial set of data gathered at step 302 may have indicated that the user moved from an urban location to a rural location and thus should be prompted first for moving expenses and second for farm income. If, when prompted, the use indicated that they did not move, then the factors affecting the "farm income" discovery question are updated at step 320 such that the user will be asked the discovery question about farm income rather than asked the associated set of interview questions immediately. After step 320, processing can move on to the next interview question.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A computer-implemented method for predicting a user's responses to an interview question, comprising the steps of:
    collecting information about the user;
    performing machine-learning-based statistical prediction on the information about the user;
    automatically, by way of a computer, determining a discovery question to be answered by the user based on the machine-learning-based statistical prediction,
    wherein the discovery question determines whether one or more associated questions will be presented to the user;
    automatically, by way of the computer, determining a confidence score for the discovery question and a likely response to the discovery question based on the machine-learning-based statistical prediction;
    if the confidence score for the discovery question is above a first threshold, determining whether to present the one or more associated questions based on the likely response to the discovery question;
    if the confidence score for the discovery question is below the first threshold and above a second threshold:
        presenting the likely response to the user with a prompt for confirmation; and
        determining whether to present the one or more associated questions based on the user's response to the prompt for confirmation;
    if the confidence for the discovery question is below the second threshold:
        presenting the discovery question to the user on a display associated with the computer; and
        automatically, by way of the computer, determining whether to present the one or more associated questions based on the user's response to the discovery question; and
        if it was determined to present the one or more associated questions to the user, presenting on a display associated with the computer the one or more associated questions to the user; and
        if was determined not to present the one or more associated questions to the user, skipping the one or more associated questions.

2. The method of claim 1, wherein the information about the user is collected from one or more third-party data sources.

3. The method of claim 1, wherein the confidence score for discovery question and the likely response to the discovery question are determined based on a plurality of factors associated with the discovery question.

4. The method of claim 3, wherein each factor of the plurality of factors associated with the discovery question is based on one or more data points included in the information collected about the user.

5. The method of claim 1, wherein the discovery question is one of a plurality of discovery questions to present to the user.

6. The method of claim 1, wherein the interview question is one of a plurality of interview questions making up a tax interview.

7. The method of claim 1, wherein the first threshold is greater than the second threshold.

8. One or more non-transitory computer storage media storing computer-executable instructions that, when executed by a processor, perform a method of predicting a user's response to an interview question comprising the steps of:

determining information about the user based at least in part on the user's responses to interview questions included in a prior interview and information from a third-party data source;
   performing machine-learning-based statistical prediction on the information about the user;
   automatically, by way of a computer, determining a plurality of discovery questions to be answered by the user based on the machine-learning-based statistical prediction, wherein each discovery question of the plurality of discovery questions determines whether one or more associated questions will be presented to the user; and
   for each discovery question of the plurality of discovery questions:
      automatically, by way of the computer, determining a confidence score for the discovery question and a likely response to the discovery question;
      if the confidence score for the discovery question is above a first threshold, automatically, by way of the computer, determining whether to present the one or more associated questions based on the likely response to the discovery question;
      if the confidence score for the discovery question is below the first threshold and above a second threshold:
         presenting on a display associated with the computer the likely response to the user with a prompt for confirmation; and
         automatically, by way of the computer, determining whether to present the one or more associated questions based on the user's response to the prompt for confirmation;
      if the confidence for the discovery question is below the second threshold:
         presenting on the display associated with the computer the discovery question to the user; and
         automatically, by way of the computer, determining whether to present the one or more associated questions based on the user's response to the discovery question; and
      if it was determined to present the one or more associated questions to the user, presenting on the display associated with the computer the one or more associated questions to the user; and
      if was determined not to present the one or more associated questions to the user, skipping the one or more associated questions.

9. The non-transitory computer storage media of claim 8, wherein the information about the user is further collected from one or more third-party data sources.

10. The non-transitory computer storage media of claim 8, wherein the confidence score for discovery question and the likely response to the discovery question are determined based on a plurality of factors associated with the discovery question.

11. The non-transitory computer storage media of claim 10, wherein each factor of the plurality of factors associated with the discovery question is based on one or more data points included in the information collected about the user.

12. The non-transitory computer storage media of claim 8, wherein the interview question is one of a plurality of interview questions making up a tax interview.

13. The non-transitory computer storage media of claim 8, wherein the first threshold is greater than the second threshold.

14. One or more non-transitory computer storage media storing computer-executable instructions that, when executed by a processor, present a user interface configured to conduct an interview with a user, wherein the user interface is configured to:

performing machine-learning-based statistical prediction on information obtained from a third-party data source about the user;
   automatically determine a confidence score for a discovery question and a likely response to the discovery question based on the machine-learning-based statistical prediction,
   wherein the discovery question determines whether one or more associated questions will be presented to the user;
   if the confidence score for the discovery question is above a first threshold, automatically, by way of a computer, determine whether to present the one or more associated questions based on the likely response to the discovery question;
   if the confidence score for the discovery question is below the first threshold and above a second threshold:
      present, on a display associated with the computer, the likely response to the user with a prompt for confirmation; and
      automatically, by way of the computer, determine whether to present the one or more associated questions based on the user's response to the prompt for confirmation;
   if the confidence for the discovery question is below the second threshold:
      present, on the display associated with the computer, the discovery question to the user; and
      automatically, by way of the computer, determine whether to present the one or more associated questions based on the user's response to the discovery question; and
   if it was determined to present the one or more associated questions to the user, present, on the display associated with the computer, the one or more associated questions to the user; and
   if was determined not to present the one or more associated questions to the user, skip the one or more associated questions.

15. The non-transitory computer storage media of claim 14, wherein the confidence score for the discovery question and the likely response to the discovery question is based on information collected about the user.

16. The non-transitory computer storage media of claim 15, wherein the information about the user is collected from one or more third-party data sources.

17. The non-transitory computer storage media of claim 15, wherein the information about the user is based on information previously provided by the user.

18. The non-transitory computer storage media of claim 14, wherein the discovery question is one of a plurality of discovery questions to present to the user.

19. The non-transitory computer storage media of claim 14, wherein the interview question is one of a plurality of interview questions making up a tax interview.

20. The non-transitory computer storage media of claim 14, wherein the first threshold is greater than the second threshold.

\* \* \* \* \*